June 8, 1965 W. HUGHES ETAL 3,188,173
PROCESS FOR THE PRODUCTION OF OXIDES OF Al, Si AND Ti
Filed Dec. 28, 1961 5 Sheets-Sheet 2
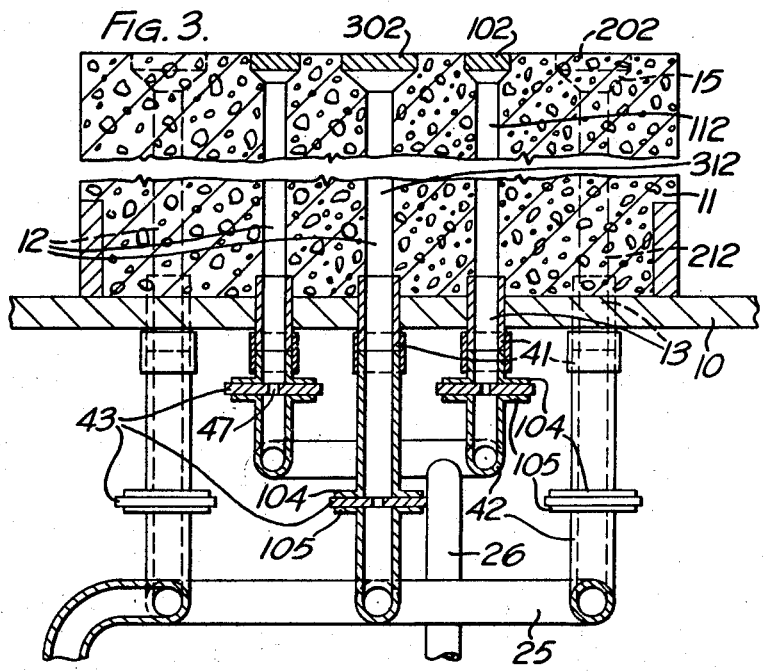
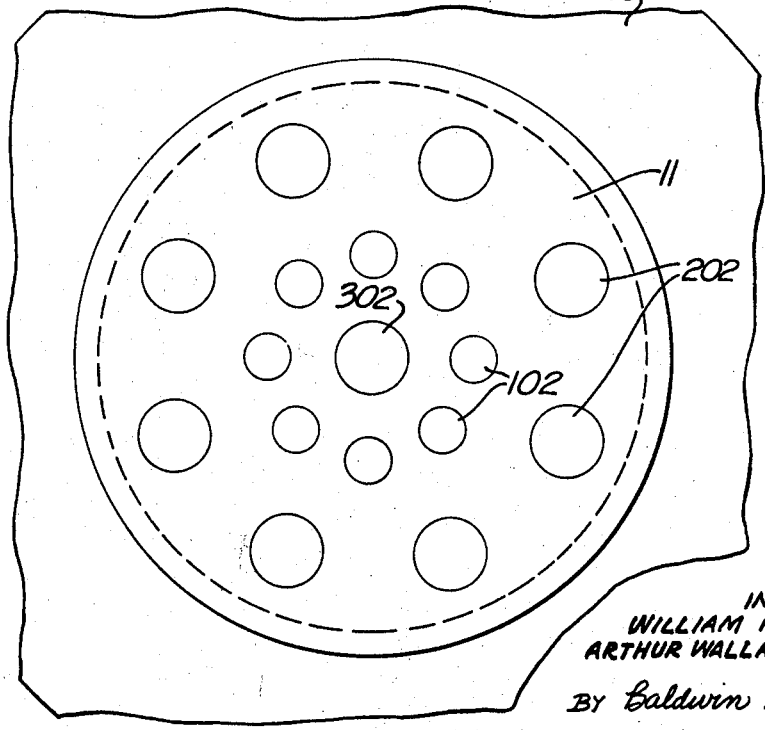
INVENTORS
WILLIAM HUGHES and
ARTHUR WALLACE EVANS
BY Baldwin & Wight
ATTORNEYS

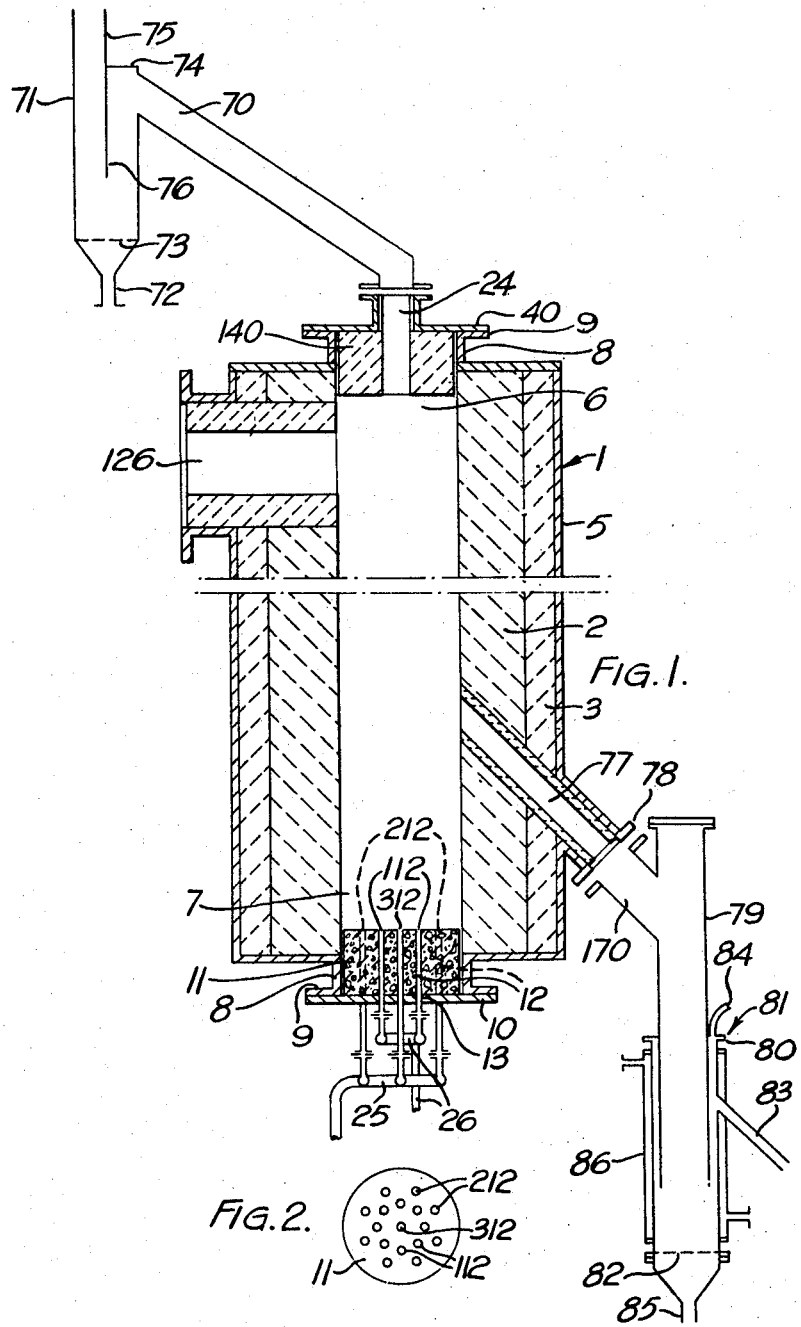

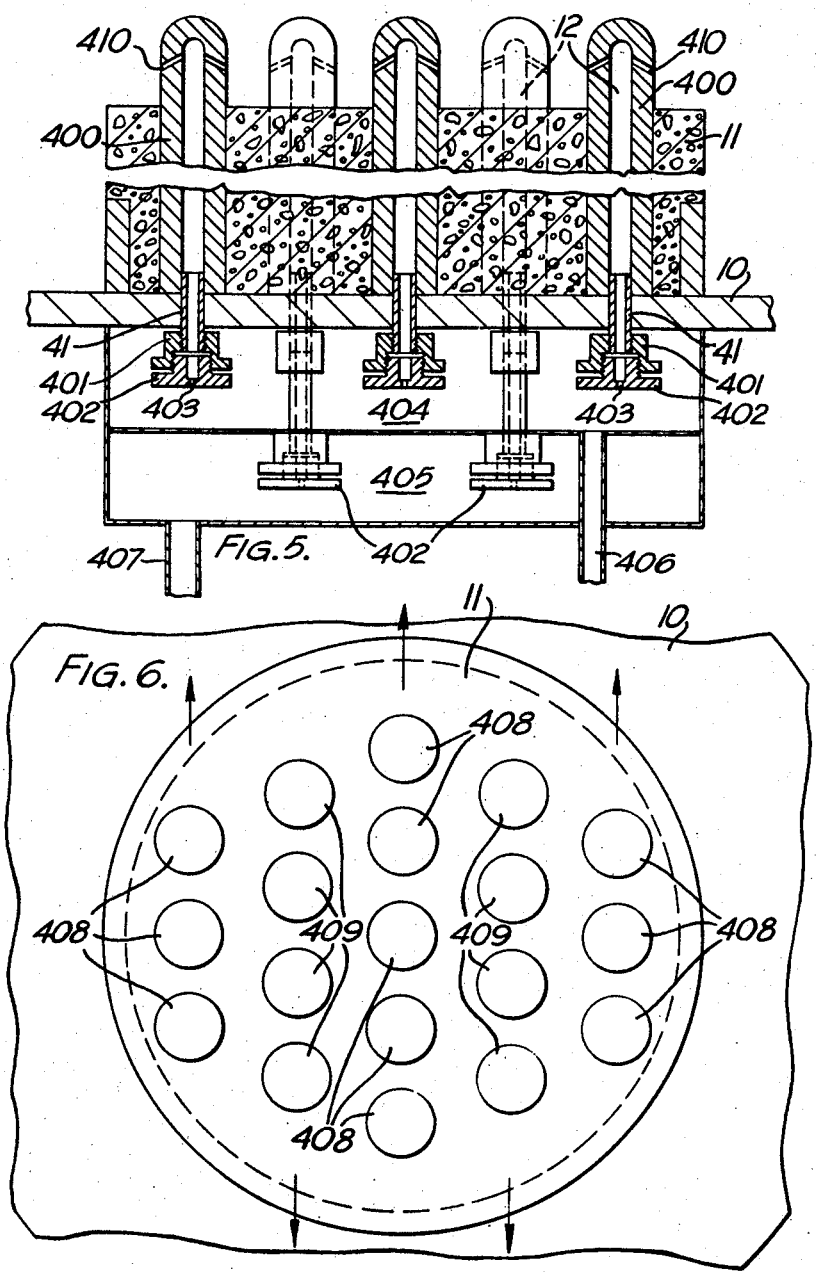

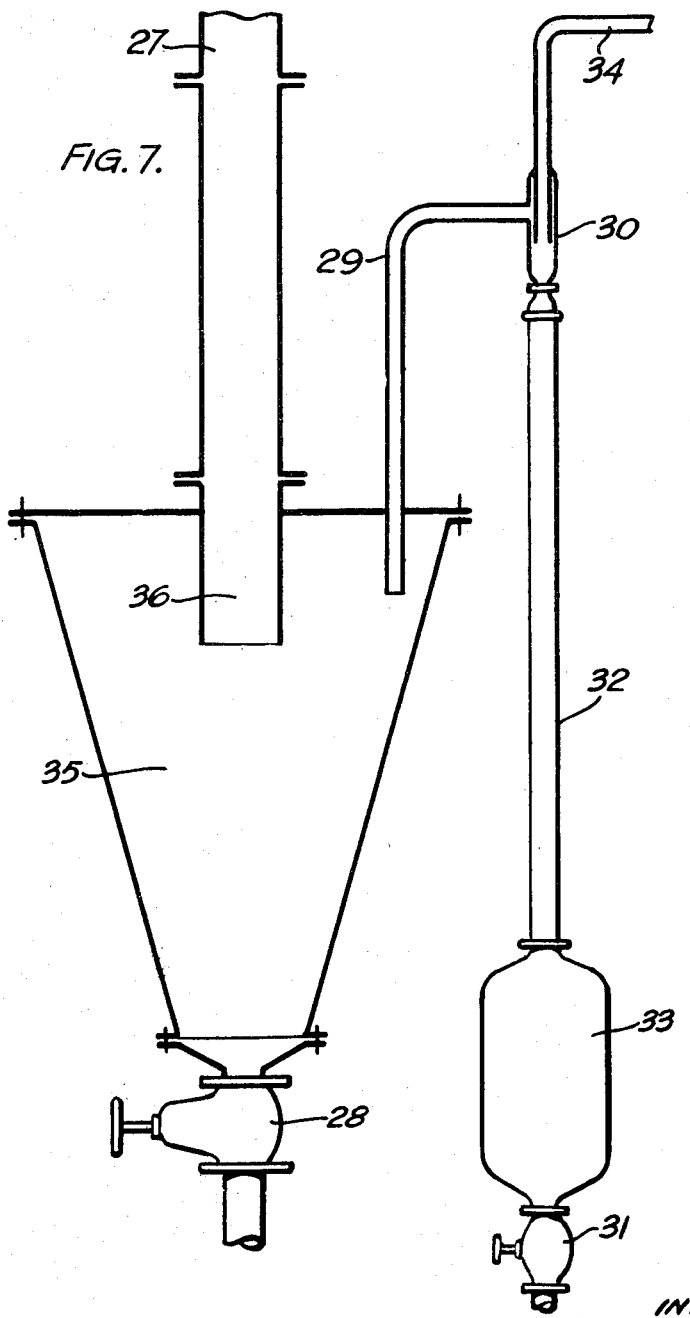

United States Patent Office 3,188,173
Patented June 8, 1965

3,188,173
PROCESS FOR THE PRODUCTION OF
OXIDES OF Al, Si AND Ti
William Hughes, Fairfield Stockton-on-Tees, and Arthur
Wallace Evans, Nunthorpe, Middlesbrough, England,
assignors to British Titan Products Company Limited,
Durham, England, a company of the United Kingdom
Filed Dec. 28, 1961, Ser. No. 162,747
Claims priority, application Great Britain, Aug. 6, 1953,
21,778/53; July 25, 1955, 21,503/55; Mar. 4, 1958,
6,987/58, 6,988/58
6 Claims. (Cl. 23—142)

This present application is a continuation-in-part of application Serial No. 720,470, filed March 10, 1958, entitled "Production of Silicon Dioxide," now Patent No. 3,043,659, dated July 10, 1962, a continuation-in-part of application Serial No. 721,578, filed March 14, 1958, entitled "Preparation of Titanium Dioxide," now abandoned, a continuation-in-part of application Serial No. 721,579, filed March 14, 1958, entitled "Production of Metal Oxides," now Patent No. 3,043,657, dated July 10, 1962, and a continuation-in-part of application Serial No 739,418, filed June 2, 1958, entitled "Production of Silicon Dioxide," now Patent No. 3,043,660, dated July 10, 1962. The present application is also linked through copendency of said applications Serial No. 720,470, Serial No. 721,578, and Serial No. 721,579, with earlier applications Serial No. 447,648, filed August 3, 1954, entitled "Preparation of Titanium Dioxide," now Patent No. 2,828,187, dated March 25, 1958, and application Serial No. 598,913, filed July 19, 1956, entitled "Production of Silicon Dioxide," now abandoned.

This invention is for improvements in or relating to the preparation of metallic oxides, more particularly the oxides of metals having chlorides which exist in vapour form at temperatures below 350° C. at atmospheric pressure. Particular examples of such metallic oxides are titanium dioxide, silicon dioxide and aluminium trioxide.

Processes for the production of finely divided oxides, especially titanium dioxide and silicon dioxide, have been suggested in which the corresponding vapourised halide, particularly the chloride, is converted to the oxide by various procedures involving oxidation or hydrolysis at elevated temperatures.

These processes, though varying considerably in detail, all require the use of burners or jet assemblies for feeding the reactant gases and vapours to the reaction space. The apparatus is often further complicated by the need to maintain the reaction temperature and, in some cases, to provide the moisture for the hydrolysis reaction by the simultaneous combustion of hydrogen, hydrocarbons or other vapourised fuels. In these processes it is rarely possible to increase the production of the apparatus by an increase in the size of the jets or burners as this usually leads to a deterioration in the quality of the product. Consequently, for large scale production it is necessary to use a large number of similar jets or burners.

In application Serial No. 721,579, filed March 14, 1958, for "Production of Metal Oxides," now Patent 3,043,657, dated July 10, 1962, there are disclosed and claimed an apparatus and method for producing a metal oxide by establishing a fluid bed of solids and introducing oxygen and a vapourous chloride of a metal of the group consisting of titanium, silicon and aluminium or a mixture of oxygen and the chloride into the bed through a plurality of conduits, and controlling the depth of the fluid bed in a manner to establish a desired relation of the pressure drop across the conduits to the pressure drop across the bed. The metal oxide so produced, or at least a portion thereof, is carried away with the gases leaving the bed.

It is an object of the present invention to provide a process for the manufacture of metallic oxides as aforesaid which is highly efficient and in which the reaction temperature can be readily controlled, and which is adaptable for large scale operation.

More fully stated, it is an object of the present invention to provide a method and apparatus for controlling the reaction temperature in such a process by discharging hot bed material from the fluidized bed of inert particles, and introducing cooler bed material to the bed. For economy, the discharged bed material may be cooled and at least a part of the then relatively cool material returned to the bed.

It is a further object of the invention to provide a process for the manufacture of metallic oxides as aforesaid from the corresponding chlorides, which obviates or minimises the disadvantages of prior art processes.

A still further object of the invention is the production of metallic oxides as aforesaid by continuous methods utilising fluidised beds carried out in large scale reactors under self-sustaining conditions where no heat need be supplied to maintain the reaction, i.e. the action being carried out under autothermal conditions.

Other objects include the utilisation of reaction conditions according to which the gaseous and vapourised reactants are delivered to the reaction zone under conditions ensuring maintained uniform conditions while the relative proportions of the reactants are controlled as desired.

Still further objects and advantages will appear from the more detailed description given below, it being understood that such more detailed disclosure is given by way of explanation and illustration only and not by way of limitation, since various changes therein may be made by those skilled in the art without departing from the scope and spirit of the present invention.

It has been shown in said applications that metal chlorides, more particularly titanium tetrachloride, silicon tetrachloride and aluminium trichloride, may be oxidised by establishing a fluidised bed of inert solid particulate material, maintaining the temperature of said bed sufficiently high to cause the metal chloride to react with oxygen while introducing the metal chloride and oxygen into said bed, whereby the metal oxide is formed, and carrying the metal oxide thus produced away with the gases leaving the fluidised bed.

The particulate inert solid material constituting the bed in which the reaction is to take place may be selected from sand-like materials, i.e. silica, zircon, mineral rutile, alumina or massive mineral rock materials which are resistant to chlorine or chlorine-containing substances likely to be present in the course of the oxidation reaction described and at the temperatures encountered, and may, if necessary, have been treated with chlorine at high temperatures in order to remove any undesirable impurities which might otherwise be attacked during the oxidation reaction and thereby contaminate the product. The sand-like material is preferably substantially entirely composed of particles not less than 76 microns in diameter and normally not greater than about one-eighth of an inch in size. The particle size of material should, in any case, be not less than $40\mu$, preferably $80\mu$, and not substantially greater than $1000\mu$ diameter. By carefully grading the bed material in respect of the sizes of the particles thereof it is possible to control, within limits, the progress of the reaction within the bed.

Zircon sand of mean particle size $150\mu$ is the substrate material of choice for use especially in the preparation of titanium dioxide by reason of its relative hardness and because it resists attack by the by-product, chlorine, liberated in the oxidation reaction. It will be appreciated that the term "massive mineral" relates to minerals which are of such compact nature that the density of each particle thereof approximates the density of a substantially perfect specimen of the material. The material comprising the fluidised bed should be such that it would fluidise in an air stream at a temperature of 1000° C. for 100 hours at a velocity five times the minimum fluidising velocity, and the amount of dust and fine material carried away in suspension in the emerging air stream would not exceed 5 percent (preferably one percent or below) of the material originally present in the bed.

The metal chlorides react with oxygen within the bed to form the appropriate metal oxide and chlorine. For instance titanium tetrachloride reacts with oxygen according to the following equation:

$$TiCl_4 + O_2 = TiO_2 + 2Cl_2$$

Silicon tetrachloride reacts with oxygen according to the following equation:

$$SiCl_4 + O_2 = SiO_2 + 2Cl_2$$

and aluminium trichloride according to the following equation:

$$4AlCl_3 + 3O_2 = 2Al_2O_3 + 6Cl_2$$

Thus it will be seen that the formation of the metal oxides does not result from a hydrolytic reaction, such as has been the case in many previous vapour-phase oxidation processes, and this results in the formation of chlorine, rather than hydrochloric acid, which latter, has various disadvantages.

The molar ratio of oxygen to the chlorides of tetravalent metals is preferably within the range 1:1 to 2:1. Higher proportions of oxygen, e.g. up to 5:1, may be used, but, especially when using titanium tetrachloride or silicon tetrachloride, complete reaction of the metal chloride is generally achieved within the preferred range. Molar ranges less than 1:1 obviously give incomplete oxidation of the chlorides of tetravalent metals. When using a chloride of a metal which is not tetravalent, the suitable molar proportions of reactions will clearly be different. For instance, in the case of aluminium trichloride complete reaction of the trichloride will not be achieved unless a minimum oxygen to aluminium trichloride molar ratio of 3:4 is used.

The reactants may be used in a relatively dry condition, or, for control in the reaction, a little moisture may be tolerated, particularly in the oxygen stream. It will be appreciated that the presence of more than a little moisture is desirably to be avoided, since, for instance as the starting material is a chloride, the presence of moisture may convert the chlorine produced to hydrochloric acid. The latter is generally detrimental to the process, in that hydrochloric acid cannot so readily be re-used for the purpose of chlorination, as normally conducted in accordance with the preferred process of this invention. On the other hand, the chlorine produced can conveniently be utilised for the production of further supplies of metal chloride by chlorination of metalliferous materials.

When chlorinating titaniferous materials to obtain titanium tetrachloride, the reaction is highly exothermic and it is essential to employ a means of indirect cooling of the reaction products, which, in effect, normally means the use of metal and hence poses the problem of corrosion. The presence of hydrogen chloride aggravates this problem. Since it is not in practice possible to operate a commercial process for chlorinating titaniferous materials with hydrogen chloride, it will be realised that any conversion of chlorine into hydrogen chloride represents a loss of chlorine to the system. When chlorinating ferrosilicon to obtain silicon tetrachloride, the reaction, whether hydrogen chloride or chlorine is used, is highly exothermic and it is again essential to employ in conjunction therewith a means of indirect cooling, with the attendant disadvantages already mentioned. Furthermore, in the chlorination of ferrosilicon with hydrogen chloride, hydrogen is formed and this entails the necessity of separation from the silicon tetrachloride vapour and involves certain additional safety precautions. Where the source of silicon tetrachloride is native silica, it is still more desirable that chlorine be used for chlorination, rather than hydrochloric acid.

The temperature of the fluidized bed should be maintained within the range of 500° C. to 1300° C., preferably 900° C. to 1100° C., the range of 1000° C. to 1050° C. giving especially good results. The reaction is exothermic and the bed of solid inert particles acts as a heat reservoir. With a well-insulated furnace, the heat generated by the reaction suffices to maintain the reaction without supplying auxiliary heat. This is to be distinguished from the disclosures in the aforesaid patent applications Serial Nos. 598,913 and 447,648, now Patent 2,828,187, according to which it is generally required that additional heat should be applied, for instance by external heating means, by admitting one or both reactants into the bed in a heated state, or by admitting a combustible gas to the bed so as to burn with gaseous oxygen and supply the required additional heat.

The apparatus more particularly described in the aforesaid patent applications is very useful when it is desired to carry out oxidation of metal chlorides on a very small scale. However, when it is desired to carry out the operation on a large scale, the use of external heating should be avoided since, owing to the corrosive nature of the metal chlorides and of the reaction products, the furnace is likely to be constructed of ceramic non-conductive material, and so external heating is not only uneconomic but is also difficult to control in the sense that the temperature conditions over a large reactor tend to be irregular, and this brings about variations in the product. An important advantage of the present invention is that it makes possible the autothermal oxidation of metal chlorides on a large scale and so avoids the necessity of external heating, and the consequent variations in the product.

As has been indicated above, it is important to minimise variations in the product, and it is in consequence desirable to distribute the reactant gases uniformly over the cross-section of the reactor furnace and to maintain a desired temperature in the reaction zone. This problem is not of such great importance in small-scale reactors. With large-scale reactors, the problem arises of obtaining uniform conditions of fluidisation, proper intermingling and distribution of the reactants and control of the bed temperature, and the present invention solves this latter problem.

It has now been found that a particularly advantageous method of operation comprises reacting the vapour of a metal chloride of a metal of the group consisting of titanium, silicon and aluminum with oxygen in the course of their upward passage through a fluidised bed of inert solid material so that the metal oxide which is produced is at least for the most part discharged from above the bed entrained in outgoing gases, characterised by the following features:

(a) That the reactants are heated in the bed to the extent required to cause them to react so that external preheating is not required;

(b) That the bed, adequately insulated, contains a sufficient quantity of the inert solid material to conserve from the heat of the exothermic reaction what is necessary to effect continuously said heating of the reactants which are, or at least one of which is, being introduced so rapidly as to fluidise the bed in the desired manner; and (c) That the temperature of the bed is controlled, i.e. kept low enough, by removing from the bed relatively hot inert bed material and correspondingly adding relatively cool inert bed material to the bed.

The invention is applicable typically when performing methods further characterized in:

(d) That the reactants are introduced into the bed through a plurality of inlet ducts distributed and mutually arranged with respect to the horizontal cross-sectional area of the bed so as to enable uniform fluidisation of the bed. The reactants may be pre-mixed but it is preferred to introduce them separately into the bed through respective inlet ducts distributed and arranged as aforesaid and so as to ensure the intermingling of the respective reactants required for their inter-reaction to take place within the bed;

(e) That the inlet ducts for the reactants are provided with constrictions of predetermined dimensions to ensure that a supply under pressure of the reactants, in their required proportions, is appropriately distributed among the inlet ducts appertaining thereto; and (f) That each constriction in an inlet duct produces a pressure drop from the pressure of the supply of reactant thereto which is at least one half of the pressure drop from the bottom to the top of the fluidised bed.

As regards (a) above it will be understood that external preheating of the reactants is not completely precluded because, in the first place, the metal chloride will be preheated at least to the extent of vapourising it and, in the second place, there is no disadvantage, if convenient so to do, to use oxygen which is preheated to a moderately raised temperature. In fact it is desirable to preheat the oxygen at least to the extent necessary to prevent condensation of the metal chloride vapour, e.g. to a temperature of 50 to 100° C., the precise temperature depending on the particular metal chloride used.

As regards (b) above it is obvious that the size of the cross-sectional area of the bed is a more important factor than height of the bed because increase of height to accommodate the required amount of bed material would unduly increase heat losses apart from requiring larger fluidising forces. Therefore, to achieve the desired autothermal operation of the process there is a minimum size for the cross-sectional area of the bed and we estimate that this means, assuming a cylindrical reaction chamber, that the diameter of the bed must be at least fifteen inches. It may of course be larger but it should be borne in mind, that in designing for substantially larger diameters, the conserved heat may exceed what is required to maintain the reaction and that provision for cooling of the reaction zone should therefore be made.

The fluidised bed employed may be as described hereinbefore as to bed materials, particle size, and like details, except that, as has already been specified, there should be sufficient inert solid material to conserve from the heat of the exothermic reaction at least what is necessary to maintain continuance of the reaction.

As has already been mentioned, the gaseous reactants are continuously introduced into the inert hot bed through a plurality of inlet ducts to maintain uniformity of reaction throughout the bed. The velocity of the gas maintaining the bed in the fluidised state is desirably between two and fifty times the minimum required for fluidisation, and preferably between three and ten times such minimum. For this purpose, the inlet ducts are provided with the above-mentioned constrictions, the size of which is so chosen that with the necessary rate of gas-flow the pressure-drop across the constrictions is at least one half, and desirably less than fifty times, the pressure-drop of the gas in passing through the bed, thus affording a substantially even flow of the gaseous reactants over the whole of the bed material.

The pressure drop across the constrictions will generally exceed 2 lbs. per square inch, and the total pressure drop across the constrictions and the bed will generally be above 3 lbs. per square inch but rarely over 100 lbs. per square inch.

The temperature of the reactor, when of internal diameter considerably greater than fifteen inches (say eighteen inches or greater) may be controlled, in part, by the use of gaseous coolants as exemplified by chlorine, nitrogen, carbon dioxide or cooled recycled tail gases which may be introduced directly into the fluidised bed, or by liquid chlorine injected into or sprayed upon the bed. However, in accordance with the present invention, the temperature of the reactor is primarily or entirely controlled by introducing, progressively, relatively cool sand or other inert bed material into the bed, and correspondingly discharging hot sand from the bed so that a substantially constant bed level is maintained.

Under the temperature conditions hereinbefore specified, other general control factors may be varied to maintain the conditions desired. Thus the oxygen gas and metal chloride vapour will usually be fed to the reactor at a velocity (assuming the reactor to be empty) of from about one quarter to about two feet per second, or higher. Bed material is progressively fed into and out of the reactor, and the rate of feed may vary, as illustrated in the examples. But any conditions used must be balanced for autothermal operation. In general, it may be noted that in any given installation the insulation is fixed, and the oxygen and metal chloride feed is determined at least in part by the amounts required to maintain fluidisation. Under these circumstances the temperature will be kept down within the desired range by feed and discharge of bed material as mentioned above.

In a preferred embodiment, the reactor is essentially a vertical shaft, usually cylindrical, and lined internally with chlorine-resisting brickwork which, in turn, is protected by an outer shell of insulating brick, the whole being contained within the steel shell, the latter terminated at the top and the bottom with openings corresponding to the shaft on which are constructed extension pieces which are flanged to take a header in the case of the top and a hearth unit to be attached to the bottom. The latter unit desirably consists of a steel plate, surmounted by a heat-insulating block sealed thereto and itself surmounting gas-inlet and gas-supply means. The steel plate contains a number of apertures spaced uniformly according to a predetermined plan in order to provide for the admisison of the reactants, and the insulating block contains a number of bores, in which refractory tubes may be fitted, to provide passages registering with the apertures. The apertures in the plate are fitted with gas-inlet means having constrictions of predetermined size. The passages through the insulating block may optionally be provided at their upper ends with devices designed to prevent solids from falling down therethrough but to permit the flow of gas upwards. Said block functions essentially to insulate from the heat of the reactor the metal plate and the gas inlet means and gas-supply devices positioned below. The whole hearth unit assembly is constructed so as to fit into the base of the furnace shaft so that the metal plate supporting the structure may be attached to the lower flanged end of the steel shell of the furnace.

One set of the inlet means is designed for the admission of metal chloride and another set, appropriately neighboured with the first mentioned set, for the admission of the oxygen. The inlet means for metal chloride into the appropriate passages may be connected to one or more manifolds or to a windbox, and the inlet means feeding the oxygen may similarly be connected to a separate manifold, or manifolds, or windbox. In either case, it will be clear that the gas-inlet means, preferably welded on to or into the metal plate, will be of such length and so fabricated that they may be conveniently connected to link with the respective manifolds or windboxes. With a windbox construction, there may be a plug containing the above-mentioned constriction at the point of entry to each inlet means. In the case where a manifold is used, each inlet means may comprise a pipe with a flanged end connected with a corresponding flanged end of a pipe leading from the manifold, the constriction being present as an orifice in a disc held between the two flanged ends.

A preferred feature is that there should be an admission of the oxygen reactant round the walls of the reactor, so far as possible, in order to avoid undue reaction at the static surface provided by the wall, as opposed to the dynamic surface provided by the fluidised particles.

Although it is desirable to incorporate as large as possible a number of gas ports into the base of the reactor, there should not be so many ports as will weaken the base of the reactor. It is also of course desirable to make the hearth unit at the base of the reactor as insulating as possible so as to retain the heat of reaction within the furnace.

A feature according to the preferred and particularly advantageous method of operating the invention as disclosed in the aforesaid application Serial No. 721,579, now Patent No. 3,043,657, is the use of constrictions of predetermined dimensions in the inlet ducts for the reactants. These constrictions are an important controlling factor in the system of gas distribution, and the dimensions are determined having regard to the fluidisation required, the properties, i.e., the density and viscosity, of the reactant gas, and the amount of gas which it is desired to admit, taking into account the number of inlet ducts available. It will be appreciated that the constrictions for the different reactants may be of different dimensions.

The header plate which is secured to the flanged end at the top of the steel shell of the furnace may be constructed with two openings, one for the temporary insertion of a poker or other suitable device to effect initial heating of the furnace and also for admission of the material forming the bed, and the other for conveying the products of reaction from the furnace to suitable cooling, collecting and/or separating devices to be described hereinafter.

With the hearth unit affixed, any one of the above-mentioned particulate solid inert materials, or a mixture of such materials, is fed into the furnace to a static depth desirably of approximately 1–3 feet. It may be more but this is usually unnecessary. The bed thus formed is then fluidised by a stream of air fed through the inlets at the base of the reactor, and a pre-ignited gas poker may be inserted into the bed. In this way, the furnace may be raised to a temperature of say approximately 1000° C., whereupon the gas poker is removed, and the inlet through which it was injected suitably sealed. At this stage the air-stream is shut off and oxygen, or a gas rich in oxygen, is passed into the furnace through the appropriate inlets. The metal chloride ductings, inlets and passages are, to start with, swept with a stream of nitrogen, and then the metal chloride is passed therethrough, whereupon reaction takes place substantially entirely within the bed. The metal oxide thus produced is carried up out of the bed entrained with the chlorine-containing product gases and is desirably led from the furnace through the ducting in the header to suitable cooling, collecting and/or separating devices described later herein, which may be of various types.

The metal oxide produced by the reaction is in a finely-divided state and is carried forward from the bed entrained as a suspension in the chlorine-containing product gases. The temperature of this mixture as it leaves the bed is in the neighbourhood of 900–1200° C., normally varying within the range of 800–1250° C. As the gases are corrosive it becomes necessary to effect cooling whilst they are still contained within apparatus lined with chlorine-resistant material until they are sufficiently cooled to permit cooling in metal or other conduits which are more highly heat-conductive. Various methods of effecting this cooling may be used depending on the particular oxide concerned, such as by quenching with water or by recirculation of cool gases. The gases which are cooled preferably to at least 400° C. are thereafter led through well-known cooling devices prior to collection and/or separation of the metal oxide from the gases. The separated metal oxide may then be purified in any suitable manner for the removal of chlorine.

While as indicated, substantially all the metal oxide produced is carried forward entrained within the product gases, a small proportion of the metal oxide may adhere to the substrate material comprising the bed. Where the accumulation, after a period of time, becomes excessive, it may be necessary to discharge the bed completely and replace it, unless the progressive renovation of the bed hereinbefore mentioned is sufficient in itself to prevent undesirable accumulation of the metal oxide in the bed.

In either case the metal oxide accretions on the bed material may, if desired, be removed by a separate procedure involving chlorination by methods which are themselves well-known in the art. It will be realised that in some cases, notably in the preparation of silicon dioxide, the expense of such chlorination, or other recovery procedure, may not render the procedure worthwhile commercially. Such material, after this cleansing and following appropriate cooling, may then be returned to the oxidation chamber for use in cooling and/or renovating the bed as mentioned above, and more fully described hereinafter. When preparing titanium dioxide, it has generally been found unnecessary to renew the bed material unless and until it has a content by weight of at least 20% titanium dioxide deposited thereon; it will be understood that the higher the titanium dioxide content the more economical is the recovery of the titanium dioxide from the bed material prior to its return to the system. On the other hand, the accretion of metal oxide on to the bed material should not be allowed to increase to such an extent that the fluidisation of the bed is unduly hindered.

It has already been demonstrated that the heat evolved by the oxidation reaction is utilised to maintain the temperature and is adequate to do so. Thus the chamber should be well insulated and the rate of heat lost to the surroundings should not be greater than the rate at which the heat is evolved. It follows, therefore, that for the process to be autothermal, the reaction chamber will require to be adequately fabricated for this purpose, both in regard to size and materials of construction. As has already been stated, it has been found in practice when using well-known materials of construction, that a minimum internal diameter of a cylindrical shaft furnace is about 15 inches. In employing a furnace of 15 inches in diameter it is possible to maintain the temperature by minor controls such as by slight variations in the rate of feed of the reactants. When, however, furnaces of larger constructon are employed, it is desirable, rather than to employ constructional material giving less insulation, to introduce into the bed cooling agents, as already indicated, whereby the temperature of reaction is kept down as required.

In a preferred embodiment, fully described hereinafter, cooling is effected and the temperature of reaction controlled by continuously feeding cool solid inert fluidisable material to the bed to replace a corresponding amount of hot material which is continuously discharged so that a substantially constant bed level is maintained. The amount of discharge and replacement will depend on the temperature of the replacement material at the time of feeding and the amount of heat to be removed. Thus to get the maximum heat removal with a minimum amount of discharge and replacement, cold replacement material can be used. In the event, however, of it being desirable at the same time to increase the purge in the bed, the replacement material may be fed in at an elevated temperature so as to obtain the same cooling effect with a larger feed and in consequence a greater purge. It will be appreciated that there may be two requirements (a) to cool the bed, and (b) to purge the bed, and by varying the temperature of the replacement material there is a freedom of action in respect of the quantity thereof to be admitted. By such means, the bed may be progressively renovated, thus overcoming the possible drawback associated with accretion of metal oxide on the bed particles.

Preferred equipment which may be used for the invention is more particularly described with reference to the accompanying drawings, to some extent diagrammatic, in which:

FIGURE 1 shows in vertical sectional elevation a shaft furnace chamber, a solids-feeding device and a solids-collecting and cooling device;

FIGURE 2 is a plan view of a detail of FIGURE 1;

FIGURE 3 is an enlargement in vertical elevation of a detail of FIGURE 1 slightly modified;

FIGURE 4 is a top plan view from above of FIGURE 3;

FIGURE 5 shows an enlargement in vertical sectional elevation of a modified detail of FIGURE 1;

FIGURE 6 is a top plan view of FIGURE 5;

FIGURE 7 is a diagrammatic sectional elevation of apparatus for separating products formed in the apparatus of FIGURE 1;

Figure 8:
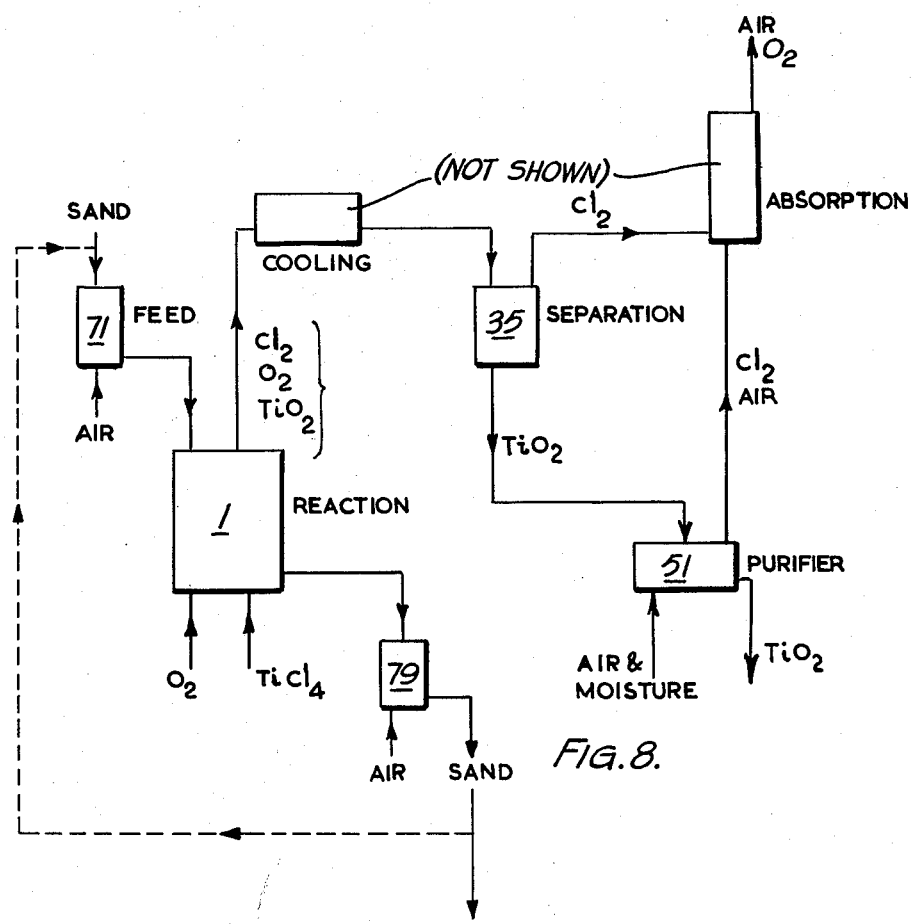
FIGURE 8 is a flow diagram illustrating the complete process operation as applied to the production of titanium dioxide by the oxidation of titanium tetrachloride, and also illustrates the method as applied to the production of silicon dioxide by the oxidation of silicon tetrachloride, and the method as applied to the production of aluminum oxide by the oxidation of aluminum trichloride.

In FIGURE 1 there is shown by the general reference numeral 1 a furnace chamber lined with chlorine-resisting brickwork 2 supported and lined on the outside with insulating brickwork 3, the whole being contained in a steel shell 5 which has openings at the top 6 and bottom 7. Onto these openings are welded short collars 8, terminating in flanges 9, the whole being mounted by means not shown, so that furnace 1 stands vertically.

A metal base plate 10 has surmounting it a ceramic block 11 constructed so that when the base plate 10 is inserted into the bottom opening 7 of the furnace 1, it will neatly fit whereby the block 11 serves to insulate from the shaft of the furnace 1 the base plate 10 below. The base plate contains apertures 13 registering with bores 12 in the block 11, the apertures 13 and the bores 12 being distributed over the plate 10 and block 11 in a design which is shown in plan view in FIGURE 2.

In this particular and somewhat simplified design, the bores 12 are subdivided into (1) a set of passages 112 for admission of the metal chloride, the passages 112 being arranged in the form of an octagon, i.e. there being eight passages surrounding the centre of the block 11, and (2) a set of passages 212 and 312 for admission of oxygen, these latter passages being arranged in the form of an outer octagon of passages 212 and an additional passage 312 in the centre of the block 11, the apertures 13 registering with the passages 112, 212 and 312, as has already been indicated.

The upper parts of the bores in the ceramic block 11 may be fitted with gas-emergent means designed positively to bar ingress of the bed material, and yet to permit the passage of the reactant gases, but it is preferred to operate without the use of such devices, and have passages 12 of limited diameter such that the reactants may be fed with sufficient velocity to prevent solid body material from falling back into the passage. Thus FIGURE 1 shows passages 12 without any such devices.

FIGURE 1 shows an arrangement in which the passages 12 are fed with reactants from a manifold system. A similar system is also shown in more detail in FIGURE 3, although in the latter figure, solids non-return devices in the form of porous caps are shown in the upper portions 15 of the passages 12.

One manifold 25 distributes oxygen to passages 212 and 312, while another manifold 26 distributes metal chloride vapour to passages 112. All the passages 12 communicate with pipes 41 which are welded to the plate 10 and are fitted with flanges 104 (see FIGURE 3) at their lower extremities. To each flange 104 is secured a flange 105 on a pipe 42 leading to the manifolds 25 and 26, respectively, for oxygen and metal chloride, a constriction being provided by a machined orifice 47 present in a disc 43 being held between the flanges 104 and 105.

FIGURE 3 also shows the provision of gas-permeable solids-impermeable devices 102, 202, and 302, in the upper portions of the passages 12, the latter being flared so as to accommodate the devices which prevent solids from falling into the passages and the gas-feeding systems, while allowing the gas to escape therethrough. It will be seen that the devices 202 and 302 in the oxygen inlet passages 212 and 312, respectively, are of larger size than the devices 102 in the metal halide passages 112. Instead of these devices, other types may be used but it is preferred to rely merely on the force of the fluidising gases to prevent solid material from falling into the feed system.

A further modification is shown in FIGURES 5 and 6 where refractory tubes 400 made for example of an alumino silicate are fitted in the bores in the insulating block 11, and have outlets to the furnace in their tops as shown at 410. Pipes 41 welded to the plate 10 pass through the apertures therein and extend into the tubes 400. Sockets 401 are secured on the lower ends of the pipes 41 and these receive screw plugs 402 having orifice constrictions 403. It will be noted that certain of the pipes are coupled to downward extension pipes and that these have the sockets and plugs at their ends. The plugs of the pipes which are not extended downwards are open to a windbox 404 whilst those of the extended pipes are open to a windbox 405.

Windbox 404 is adapted to receive an oxygen supply through inlet 406, and windbox 405 to receive a metal chloride supply through inlet 407. It will be seen from the plan view of FIGURE 6 that the tubular passageways to the furnace for the oxygen are in groups 408 whilst those for the metal chloride are in intermediate groups 409. Although a windbox supply with orificed plugs is shown in FIGURE 5, it will be appreciated that manifolds, and constrictions formed in orificed discs, may be used instead. In fact the pattern of distribution of the respective inlet means shown in FIGURE 6 lends itself conveniently to a supply from manifolds because the latter can be straight, corresponding to the straight dispositions of the passageways for the oxygen and metal chloride as seen in FIGURE 6. In that case the manifolds for the oxygen and metal chloride may be supplied in opposite directions from manifolds, as indicated by the arrows.

Reverting to FIGURE 1, the top 6 of the furnace is covered by a closure 40, which is affixed to the upper flange 9 and which surmounts a block 140 of insulating ceramic material. This closure is formed to provide a port 24 for feeding in the solid bed material which subsequently constitutes the bed in operation. The solid bed material is fed from a solids-feed device 71 which is shown diagrammatically in FIGURE 1. The solids-feed device consists of a 5 ft. length of steel tube, 6″ in internal diameter, with a tapered bottom to which is sealed flange pipe 72, 2″ in diameter, communicating with a source of compressed air. Above the taper at 73 is affixed a perforated plate, carrying holes 1/16″ in diameter and spaced at half-inch intervals to form a square pattern. The upper portion of the tubing is bisected over a length of 3 feet and the top of the lower portion thereof is sealed with a horizontal steel cover 74. An inclined flanged pipe 70, 2″ in diameter, leads directly to the furnace 1 from the lower part of the feed device at a point just below the cover. A flat steel strip 75 is sealed on to the bisected length of tubing, said strip projecting downwards at 76 to about 6″ from the base of the tube, measured from 73; the purpose of this projection being to prevent or minimise the effects of any back-flow of gases from the reactor.

There is also provided a port 126 in the side wall of the furnace 1 through which the products of reaction are conveyed to ancillary apparatus for cooling and separation. The ancillary apparatus in the form which is shown in FIGURE 7 consists of a conically-shaped receiving vessel 35 into which the products discharged from the port 126 of the furnace are led through a pipe 27 having a centrally-positioned discharge conduit 36. In this vessel, the greater part of the coarse metal oxide agglomerates settle and may be discharged, periodically or continuously according to requirement, through a valve 28, being aided where necessary, by vibratory motion imparted to the sides of receiving vessel 35 by known means. The gases leaving this separator via conduit 29 are conveyed to a cyclone or, if necessary, a series of cyclones as represented by cyclone 30 wherein any of the finer agglomerates of metal oxide produced may be separated from the gas stream, which is led off through ducting 34. The finer material descends through a pipe 32, is collected in a collector 33 below the cyclone, and is discharged through valve 31, either periodically or continuously according to requirement. The gases after being stripped of their solid content and usually containing chlorine as the main constituent, may be re-used directly for chlorination of metalliferous material, as, for example in the case of titanium, ilmenite or rutile and in the case of silicon, ferrosilicon, or silica, or they may be passed to conventional equipment for the removal of the chlorine constituent either by cooling, compression and liquefaction of the chlorine constituent or by absorption of the cooled gases in sulphur chloride or other suitable absorbent from which they may be regenerated by conventional means.

Solid material discharged from the base of separator 35 via valve 28 or from cyclone 30 via valve 31, is collected for subsequent removal of the absorbed chlorine-containing gases.

Reverting to FIGURE 1, at a point towards its base, the furnace 1 is provided in the interior of the furnace with a conduit 77, which is fabricated in refractory chlorine-resistant brick, and inclined at an angle of about 45° to the vertical. The conduit 77 may either be sealed, or, if it is desired to introduce solid bed material and withdraw surplus material during operation of the apparatus, the lower (and outer) end of this conduit is connected by means of flanged joint 78 to a side arm 170 of a vertical pipe 79, 3″ in internal diameter, sealed into a flanged lid 80 of a mild steel vessel 81, of diameter 8″ and height 2 ft., the pipe 79 projecting downwards within the vessel 81 to a point approximately 3″ above the top of its tapered base. Just beneath the lower extremity of pipe 79, a stainless steel disc 82, ½ inch thick, is affixed to the sides of vessel 81, said disc being perforated with holes of diameter $\frac{1}{16}$″ arranged in a square pattern of side length 2″. At a point approximately 6″ from the sealed top, vessel 81 is provided with a pipe 83, which serves as a means of overflow. At the top of vessel 81 is a small outlet port 84 through which the fluidising gases can be voided to atmosphere. Through the lower extremity of its tapered base, vessel 81 is fitted with flanged pipe 85, connected with a source of compressed air. The part of the vessel 81 above the perforated disc 82 is encased in a steel jacket of conventional design 86, through which a stream of cold water can be continuously passed to cool the vessel.

A flow diagram is given in FIGURE 8 of the drawings to show how these various treatment steps may be correlated into a unitary process for titanium dioxide, silicon dioxide and aluminum oxide formation, it being understood that any individual treatment step diagrammatically illustrated in the flow diagram may be of the character illustrated above for FIGURES 1 to 7 or may take other forms. As illustrated, the bed material with or without pretreatment is fed continuously into the reaction zone into which the reactants are introduced. The bed material may be purged of accumulated metal oxide from time to time and replaced.

The product gases from the reaction zone entrain the metal oxide and may be cooled and then separated. The metal oxide product thus separated is purified by removal of chlorine, and may then be sent to a grinding or dressing operation and then to storage.

The flow diagram in FIGURE 8 thus illustrates a variety of mutually co-operating steps in processes for producing the desired oxide. The diagram has legends appropriate to the production of titanium dioxide. For consideration of the invention as practiced in the production of silicon dioxide, the legend "TiCl₄" should be read as $--SiCl_4--$, and the legend "TiO₂" should be read as $--SiO_2--$. Similarly, for the production of aluminium oxide, the legend "TiCl₄" should be read as $--AlCl_3--$, and the legend "TiO₂" as $--Al_2O_3--$.

As shown by the broken lines in the diagram, the cooled bed material discharged from the pipe 79 may, at least in part, be re-circulated to the fluidized bed via the feed device 71. Also, as indicated in the diagram, part of the discharged bed material may be sent to waste and a corresponding amount of fresh bed material delivered to the feed device 71, so as to maintain a substantially constant level in the bed.

The following examples are given for the purpose of illustrating the invention; all flow rates of gas are calculated on the basis of atmospheric conditions of temperature and pressure.

*Example 1*

The reactor consisted of a vertical steel shaft furnace 1, substantially as illustrated in FIGURE 1, having an overall height of approximately 13 feet. The furnace 1 was lined internally with chlorine-resistant brickwork 2 of a thickness of 12 inches. This brickwork was supported by 6 inches of outer insulating brickwork 3 and the whole was contained within a steel shell 5 with openings top 6 and bottom 7 corresponding to the vertical shaft (see FIGURE 1). The diameter of the shaft was 24 inches.

The opening 7 at the bottom of the furnace 1 was sealed by a perforated plate 10 surmounted by a layer 11 of chlorine-resistant concrete 9 inches thick, both the plate 10 and the concrete layer 11 immediately above it having 19 passages (1$\frac{7}{16}$″ diameter) evenly distributed as shown planwise in FIGURE 6. On the under side of the plate 10 ducting and manifolds were installed as described hereinbefore with reference to FIGURES 1 and 3, as modified for application to the distribution of passages shown in FIGURE 6. Thus the conduits corresponding to the two outer lines containing three and the central line of five passages were connected to one manifold for supply and distribution of oxygen or air to the furnace, and the ductings corresponding to the two inner lines of four perforations were connected to a separate manifold to supply the titanium tetrachloride vapour, as shown by the arrows in FIGURE 6. The diameter of the constrictions in the inlet means for the supply of titanium tetrachloride vapour was 0.24 inch, and for the oxygen supply was 0.16 inch.

The upper part of the shaft was provided at one side near the top with a port 125 of 12 inches diameter to afford the means of egress for the titanium dioxide entrained in the gas stream emerging from the reactor at a temperature of about 900° C. to 1000° C.

The interior of the lower part of the shaft communicated directly via a "take-off" conduit 77 (internal diameter 4 inches) inclined at an angle of about 45° to the vertical to the discharge device 79.

The top of the furnace terminated in a plate 40 carrying a port 24 leading to a flanged conduit 70, and served the dual purpose for introducing a gas poker in order to pre-heat the bed and subsequently for admission of material constituting the bed to be fluidised, by attachment of the feed device 71 to the flange.

The plant was operated under the following conditions: zircon sand of average diameter 150 microns was fed to a static depth of approximately 3 feet into the reactor 1. This bed was fluidised by means of air fed via both the manifolds and ductings provided for the oxygen and titanium tetrachloride. By insertion of a pre-ignited gas poker through the port 24 in the top of the furnace, the bed was pre-heated to a temperature of 1100° C. At this stage, the gas poker was removed and the unit 71 connected. Meanwhile, the air by which the bed was initially fluidised was replaced in the oxygen supply manifold by oxygen suppplied at a rate of 33 cu. ft. per min, measured at atmospheric temperatures and pressure, while for the purpose of displacing air from the whole of the titanium tetrachloride inlet means, nitrogen was passed through the other manifold which connected with the two inner lines of four passages in the plate, until the displacement was complete, when the supply of nitrogen was discontinued, and titanium tetrachloride was thereupon admitted to the appropriate passages and thus introduced into the bed. The titanium tetrachloride so introduced was metered at the rate of 11 lbs. per minute into a steam-jacketed vaporising tube, wherein it was completely vapourised, before entering the manifold and thereafter being admitted into the fluidised bed reaction zone. The titanium tetrachloride reacted with the oxygen in the bed of zircon sand thereby fluidised and the products of reaction emerged upward from the bed in the form of a suspension of finely divided titanium oxide in chlorine, and passed through the gas outlet 126. The gases were subsequently led to conventional cooling and separation devices whereby the titanium dioxide produced was collected.

The temperature in the bed constituting the reaction zone was maintained throughout at about 980° C. This was effected by preventing overheating, i.e. by feeding zircon sand via the feed device 71 at the rate of about 40 lbs. per hour and collecting the consequential overflow from the bed via conduit 77 into the fluidised bed collecting device 79 where it was suitably cooled and dechlorinated prior to discharge via conduit 83.

The titanium dioxide product collected was treated to remove adsorbed chlorine gases and was thereafter found to be a finely divided pigment of excellent whiteness and had a tinting strength as measured on the Reynolds scale of 1300.

*Example 2*

In this instance, the reactor was similar in construction to that used in Example 1, but with the following differences.

The internal diameter was 18 inches and overall height was 7 feet. The diameter of the constructions in the manifold system were for silicon tetrachloride admission 7/64 inch, and for the oxygen admission 5/64 inch.

The inclined conduit 77 shown in FIGURE 1 was lined with chlorine-resistant brickwork of thickness 3 inches, and was positioned at a height of about 40 inches from the bottom of the furnace.

Silica sand of average diameter 250 microns was fed by means of a belt lift at a controlled rate of the order of 26 lbs. per hour to the top of the solids-feeding device as shown in the top left portion of FIGURE 1. The sand thus fed accumulated above the perforated plate 73 and was brought into a fluidised state, and to an expanded height of about 2½ feet on the side of the baffle 76 remote from the exit duct 70, by means of compressed air admitted at a rate of 130 litres per minute through the pipe 72 entering the bottom thereof. A portion of the expanded bed overflowed via duct 70 to enter the furnace and the sand was fed at a rate sufficient to control the reaction temperature. The height of the fluidised bed in the furnace 1 was established at about 40 inches by means of overflow through the inclined conduit. The bed within the furnace 1 was continuously renewed, portions thereof overflowing as aforesaid and fresh bed material being admitted to the furnace from the solids feed device via conduit 70.

Such bed material as overflowed from the furnace 1 passed down into vessel 81, therein to accumulate above the perforated plate 82, and was fluidised by passing a current of compressed air into the vessel through pipe 85 located at its base. This treatment effectively removed from the sand any residual traces of chlorine or other undesired gases. When the sand which had accumulated in vessel 81 was fully fluidised, portions thereof overflowed at a constant rate through pipe 83.

With the sand feed suspended, the bed was preheated to about 1200° C. as in Example 1. Oxygen was supplied at a rate of 209 litres per minute, and silicon tetrachloride liquid was metered at the rate of 654 cc. per minute into the steam-jacketed vapourising tube, the molar ratio of silicon tetrachloride to oxygen being 1:1.5. The temperature was maintained at 1000–1050° C. during a 5 hour period of operation by continuous slow replacement of the sandy substrate in the reactor, as described above. The fine silicon dioxide product emerging from the horizontal port 126 at the top of the furnace 1 was cooled and separated from the entraining gas, and then subjected to heat-treatment to remove therefrom adsorbed chlorine and/or hydrochloric acid.

The fine silicon dioxide so obtained after the heat-treatment consisted of a finely-divided product having an average particle size of less than 0.005 micron and a bulk density of 5 lbs. per cu. ft.

*Example 3*

In this instance the reactor was of the same construction and dimensions as in Example 2.

The silica sand constituting the bed had an average diameter of 250 microns and was fed into the furnace to a fluidised depth of 40″. The oxygen was supplied at a rate of 209 litres per minute measured at room temperature. The silicon tetrachloride liquid was metered at the rate of 654 cc. per minute, also at room temperature, through a steam jacketed vapourising tube. The molar ratio of silicon tetrachloride to oxygen was 1:1.5. In this instance the oxygen used had additionally a moisture content of 1.3% molar with respect to oxygen, this moisture-content being obtained by bleeding off prior to admission 11 litres per minute of the 209 litres per minute total oxygen stream, and bubbling these 11 litres per minute through water contained in two steel vessels each containing three feet six inches depth of water, maintained at 70° C.

The temperature of the reactor was maintained at 1000–1050° C. during a 7-hour period of operation by continuous slow replacement of the silica sand substrate in the reactor as described below.

Utilising the bed material feeding system as shown in FIGURE 1 the modus operandi of such cooling system employed in the example was as follows:

By means of an insulated filament wound in the form of a helix round the outide of vessel 71, the latter was heated electrically by a circuit providing 5 kw. of power. The cold sand was fed at the rate of 40 lbs. per hour to the top of the solids-feeding device and was heated and fluidised within the vessel 71 by means already described, i.e. by compressed air admitted at the rate of 130 litres per minute through the pipe 72 entering through the bottom and through the perforated plate 73. The temperature of the sand was controlled at about 400° C., and overflowed through the conduit 70 into the furnace 1. In this way the furnace 1 was maintained at the desired temperature of 1000–1050° C., and, at the same time, the bed was continuously renewed so as to avoid excessive build-up of reaction products on to the substrate, the surplus substrate overflowing as previously described through the inclined conduit 77.

The silicon dioxide product discharged from the furnace 1 through the port 126 was collected in an agglomerated condition after cooling in a cyclone.

It had an average size of about 0.004 micron. The bulk density of the agglomerated material was 4½ lbs. per cu. ft. After heat treatment, when two grams of this silica product was shaken with 20 cc. of water the suspension had a pH value of 4.1 as compared with a pH of 2.2 before the heat treatment. It had a surface area of 260 sq. meters per gram as measured by the B.E.T. method.

*Example 4*

The apparatus and procedure used were substantially the same as have already been described in Example 1 with similar gas distribution, bed conditions, and initial bed temperature. Oxygen was supplied through the manifold 25 at 27 cu. ft. per minute. After purging the manifold 26 with nitrogen, vapourised aluminium trichloride was admitted thereto and thus introduced into the bed. The aluminium trichloride so introduced was metered at a ratio of 8.3 lbs./minute. The aluminium trichloride reacted with the oxygen in the bed of zircon sand thereby fluidised and the products of the reaction emerged from the bed in the form of finely-divided aluminium oxide in chlorine and passed through the gas outlet 126. The gases were subsequently led to conventional cooling and separating devices whereby the aluminium oxide produced was collected.

The temperature in the bed constituting the reaction zone was maintained throughout at about 1000° C. This was effected by feeding zircon sand via the feed device 71 at the rate of about 210 lbs. per hour and collecting the consequential overflow from the bed via conduit 77 into the fluidised bed collecting device 79 where it was suitably cooled and de-chlorinated prior to discharge via conduit 83.

The aluminium oxide product collected was treated to remove adsorbed chlorine gases and was thereafter found to be a finely-divided powder of substantially uniform particle diameter averaging 0.07 micron.

It is preferred to operate the process using metal chlorides to form the appropriate metal oxides, more particularly when (a) the chloride has a conveniently low boiling or sublimation temperature, the temperature limit contemplated being of the order of 350° C., and preferably below 250° C., and (b) the oxide has a conveniently high melting and/or decomposition point, desirably about 1200° C. The oxidation reaction is exothermic at the temperature range contemplated. Thus titanium tetrachloride, silicon tetrachloride and aluminium trichloride can readily be oxidised according to the process of the invention, and zirconium and hafnium halides are also contemplated.

Although the present invention has been described with reference to specific details of certain embodiments thereof, it is not intended that such details shall be regarded as limitations upon the scope of the invention except insofar as they are included in the accompanying claims.

We claim:

1. In the production of metal oxide by reaction of oxygen with a chloride of a metal of the group consisting of titanium silicon and aluminium which is in vapour state at 350° C., the improvement which comprises establishing a bed of inert particles of a particle size range of 40μ–1,000μ, introducing oxygen and said metal chloride into said bed to flow through and uniformly fluidize said bed, heating the bed to cause the metal chloride to react with the oxygen, carrying evolved metal oxide from the bed with the gases leaving the bed, and controlling the temperature of the bed by withdrawing a portion of said inert particles from said bed at bed temperature, and adding to the bed, and separately from the introduction of oxygen and said metal chloride, a further portion of inert particles at a temperature below the bed temperature.

2. In a method of preparing a metal oxide by reaction of oxygen with a vapourous chloride of a metal of the group consisting of titanium, silicon and aluminium, establishing a reaction bed at least fifteen inches in diameter and at least one foot deep of particles inert to said chloride and of a particle size range of 40μ–1,000μ, introducing oxygen and said chloride into said bed at a rate to flow through and uniformly fluidize the bed, heating the bed to a temperature to cause the chloride to react with the oxygen, externally insulating said bed to inhibit loss of heat other than that purposely removed, maintaining a substantially constant level and capacity in said bed to retain sufficient heat for the reaction temperature to be substantially autothermally maintained at from 800° C. to 1250° C., and preventing the temperature of said bed from rising substantially above the desired reaction temperature by purposely discharging inert particle bed material from said bed at bed temperature and correspondingly introducing particle bed material to said bed.

3. In a method of preparing a metal oxide as set forth in claim 2 including renovating said bed according to the amount of accretion of undesired material therein by:
   (1) when the amount of accretion is relatively large, discharging bed material at a relatively high rate and replenishing the bed with bed material at a corresponding rate and at a relatively high temperature; and
   (2) when the amount of accretion is relatively small, discharging bed material at a relatively low rate as compared to the rate in (1) above and replenishing the bed with bed material at a corresponding rate and at a temperature realtively low as compared to the temperature in (1) above.

4. In a method of preparing a metal oxide according to claim 2 in which the hot inert particle bed material discharging from said reaction bed at bed temperature is contaminated with noxious gas from said reaction bed, and in which said method further includes establishing another bed of inert particle bed material and delivering the discharged relatively hot inert particle bed material to said other bed at a level intermediate the bottom and top of said other bed, introducing a gas into said other bed at a rate to fluidize said other bed and to cool the inert particles therein and purge said particles of said noxious gas, venting the fluidizing, cooling and purging gas at a level spaced above the top of said other bed, removing cooled inert particle material from said other bed substantially at the top thereof and utilizing the removed cooled inert particle material as the inert particle material introduced to said reaction bed at below bed temperature.

5. In the production of metal oxide by reaction of oxygen with a chloride of a metal of the group consisting of titanium, silicon and aluminium which is in vapor state at 350° C., the improvement which comprises establishing a bed of inert particles of a particle size range of 40μ–1,000μ, introducing oxygen and said metal chloride into said bed to flow through and uniformly fluidize said bed, heating the bed to cause the metal chloride to react with the oxygen, carrying evolved metal oxide from the bed with the gases leaving the bed, and controlling the temperature of the bed by withdrawing a portion of said inert particles from said bed at bed temperature, and adding to the bed, and separately from the introduction of oxygen and said metal chloride, a further portion of inert particles at a temperature below the bed temperature, the inert particles in said bed being such that when fluidized in an air stream at a temperature of 1000° C. for 100 hours at a velocity five times the minimum fluidizing velocity the amount of dust and fine material carried away in suspension in the emerging air stream will not exceed five percent of the material originally in the bed.

6. In a method of preparing a metal oxide by reaction of oxygen with a vapourous chloride of a metal of the group consisting of titanium, silicon and aluminium, establishing a reaction bed at least fifteen inches in diameter and at least one foot deep of particles inert to said chloride and of a particle size range of $40\mu$–$1,000\mu$, introducing oxygen and said chloride into said bed at a rate to flow through and uniformly fluidize the bed, heating the bed to a temperature to cause the chloride to react with the oxygen, externally insulating said bed to inhibit loss of heat other than that purposely removed, maintaining a substantially constant level and capacity in said bed to retain sufficient heat for the reaction temperature to be substantially autothermally maintained at from 800° C. to 1250° C., and preventing the temperature of said bed from rising substantially above the desired reaction temperature by purposely discharging inert particle bed material from said bed at bed temperature and correspondingly introducing particle bed material to said bed at below bed temperature, the inert particles in said bed being such that when fluidized in an air stream at a temperature of 1000° C. for 100 hours at a velocity five times the minimum fluidizing velocity the amount of dust and fine material carried away in suspension in the emerging air stream will not exceed five percent of the material originally in the bed.

References Cited by the Examiner

UNITED STATES PATENTS

| | | | |
|---|---|---|---|
| 2,488,030 | 11/49 | Scheineman | 23—1 |
| 2,760,846 | 8/56 | Richmond et al. | 23—202 |
| 2,823,982 | 2/58 | Saladin et al. | 23—202 |
| 2,828,187 | 3/58 | Evans et al. | 23—202 |

MAURICE A. BRINDISI, *Primary Examiner.*